(12) United States Patent  
Katkam et al.

(10) Patent No.: US 8,687,785 B2  
(45) Date of Patent: Apr. 1, 2014

(54) AUTHORIZATION TO PLACE CALLS BY REMOTE USERS

(75) Inventors: Vinod Katkam, San Jose, CA (US); Mukul Jain, San Jose, CA (US); Sanjeev Kumar, San Francisco, CA (US); Labhesh Patel, San Francisco, CA (US); Randall B. Baird, Austin, TX (US); Christopher E. Pearce, Dallas, TX (US); Shmuel Shaffer, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 1762 days.

(21) Appl. No.: 11/601,239

(22) Filed: Nov. 16, 2006

(65) Prior Publication Data

US 2008/0118046 A1    May 22, 2008

(51) Int. Cl.  
*H04M 3/00* (2006.01)

(52) U.S. Cl.  
USPC .......................... 379/198; 379/188; 379/200

(58) Field of Classification Search  
USPC .................. 379/32.01, 198, 142.01–142.05, 379/265.01–266.1, 211.02, 265.02, 188, 379/200, 201.01  
See application file for complete search history.

(56) References Cited

U.S. PATENT DOCUMENTS

| | | |
|---|---|---|
| 4,472,833 A | 9/1984 | Turrell et al. |
| 4,805,210 A | 2/1989 | Griffith, Jr. |
| 4,825,465 A | 4/1989 | Ryan |
| 5,008,884 A | 4/1991 | Yazawa et al. |
| 5,200,994 A | 4/1993 | Sasano et al. |
| 5,206,905 A | 4/1993 | Lee et al. |
| 5,220,599 A | 6/1993 | Sasano et al. |
| 5,249,223 A | 9/1993 | Vanacore |
| 5,341,413 A | 8/1994 | Hori et al. |
| 5,349,642 A | 9/1994 | Kingdom |
| 5,402,490 A | 3/1995 | Mihm, Jr. |
| 5,432,844 A | 7/1995 | Core et al. |

(Continued)

FOREIGN PATENT DOCUMENTS

| | | |
|---|---|---|
| EP | 1 030 504 A2 | 8/2000 |
| EP | 1536645 | 6/2005 |

(Continued)

OTHER PUBLICATIONS

Nigel Ward and Satoshi Nakagawa, "Automatic User-Adaptive Speaking Rate Selection for Information Delivery", Jun. 25, 2002, (4 pages), University of Tokyo, Tokyo, Japan.

(Continued)

*Primary Examiner* — Oleg Asanbayev  
(74) *Attorney, Agent, or Firm* — Baker Botts L.L.P.

(57) ABSTRACT

A system includes a first interface to connect with a network, and a second interface to connect with a telephone device of an enterprise. A unit controls a connection between the first and second interfaces for an outgoing call from the telephone device to a remote telephone device connected to the network. A processor subsystem coupled with the unit operates to initiate communications with a telephone device associated with a supervisor having authority to allow or deny the call. The processor subsystem also operates too present the supervisor with information that includes a purpose or reason for the outgoing call. It is emphasized that this abstract is provided to comply with the rules requiring an abstract that will allow a searcher or other reader to quickly ascertain the subject matter of the technical disclosure.

13 Claims, 5 Drawing Sheets

(56) References Cited

U.S. PATENT DOCUMENTS

| | | |
|---|---|---|
| 5,493,608 A | 2/1996 | O'Sullivan |
| 5,521,969 A | 5/1996 | Paulus et al. |
| 5,537,470 A | 7/1996 | Lee |
| 5,568,540 A | 10/1996 | Greco et al. |
| 5,608,786 A | 3/1997 | Gordon |
| 5,615,213 A | 3/1997 | Griefer |
| 5,623,537 A | 4/1997 | Ensor et al. |
| 5,754,630 A | 5/1998 | Srinivasan |
| 5,794,218 A | 8/1998 | Jennings et al. |
| 5,878,124 A | 3/1999 | Griesmer et al. |
| 5,905,448 A | 5/1999 | Briancon et al. |
| 5,912,674 A | 6/1999 | Magarshak et al. |
| 5,937,040 A | 8/1999 | Wrede et al. |
| 5,943,611 A | 8/1999 | Moelne |
| 5,974,142 A | 10/1999 | Heer et al. |
| 5,978,450 A | 11/1999 | McAllister et al. |
| 5,991,392 A * | 11/1999 | Miloslavsky ............ 379/265.02 |
| 5,999,599 A | 12/1999 | Shaffer et al. |
| 6,044,081 A | 3/2000 | Bell et al. |
| 6,122,347 A | 9/2000 | Borland |
| 6,137,862 A | 10/2000 | Atkinson et al. |
| 6,167,043 A | 12/2000 | Frantz |
| 6,259,405 B1 | 7/2001 | Stewart et al. |
| 6,271,764 B1 | 8/2001 | Okamura |
| 6,285,750 B1 | 9/2001 | Branchman et al. |
| 6,298,324 B1 | 10/2001 | Zuberec et al. |
| 6,324,271 B1 | 11/2001 | Sawyer et al. |
| 6,333,980 B1 | 12/2001 | Hollatz et al. |
| 6,366,651 B1 | 4/2002 | Griffith et al. |
| 6,373,817 B1 | 4/2002 | Kung et al. |
| 6,421,544 B1 | 7/2002 | Sawada |
| 6,438,600 B1 | 8/2002 | Greenfield et al. |
| 6,522,726 B1 | 2/2003 | Hunt et al. |
| 6,526,293 B1 | 2/2003 | Matsuo |
| 6,542,583 B1 | 4/2003 | Taylor |
| 6,542,586 B1 | 4/2003 | Helstab |
| 6,545,596 B1 | 4/2003 | Moon |
| 6,564,261 B1 | 5/2003 | Gudjonsson et al. |
| 6,567,508 B2 | 5/2003 | Katayama |
| 6,567,848 B1 | 5/2003 | Kusuda et al. |
| 6,587,545 B1 | 7/2003 | Antonucci et al. |
| 6,587,553 B1 | 7/2003 | Shaffer et al. |
| 6,587,680 B1 | 7/2003 | Ala-Laurila |
| 6,643,774 B1 | 11/2003 | McGarvey |
| 6,647,107 B1 | 11/2003 | Horrer |
| 6,654,455 B1 | 11/2003 | Isaka |
| 6,654,458 B1 | 11/2003 | Saleh |
| 6,665,534 B1 | 12/2003 | Conklin et al. |
| 6,675,216 B1 | 1/2004 | Quatrano et al. |
| 6,697,457 B2 | 2/2004 | Petrushin |
| 6,721,401 B2 | 4/2004 | Lee et al. |
| 6,738,461 B2 | 5/2004 | Trandal et al. |
| 6,766,007 B1 | 7/2004 | Dermler et al. |
| 6,769,000 B1 | 7/2004 | Akhtar et al. |
| 6,771,639 B1 | 8/2004 | Holden |
| 6,792,296 B1 | 9/2004 | Van Bosch |
| 6,792,297 B2 | 9/2004 | Cannon et al. |
| 6,798,768 B1 | 9/2004 | Gallick et al. |
| 6,798,874 B1 | 9/2004 | Ohlinger et al. |
| 6,798,877 B2 | 9/2004 | Johnson et al. |
| 6,799,052 B2 | 9/2004 | Agness et al. |
| 6,804,334 B1 | 10/2004 | Beasley et al. |
| 6,816,469 B1 | 11/2004 | Kung et al. |
| 6,826,173 B1 | 11/2004 | Kung et al. |
| 6,826,194 B1 | 11/2004 | Vered et al. |
| 6,839,761 B2 | 1/2005 | Kadyk et al. |
| 6,847,715 B1 | 1/2005 | Swartz |
| 6,859,776 B1 | 2/2005 | Cohen et al. |
| 6,870,835 B1 | 3/2005 | Chen et al. |
| 6,871,212 B2 | 3/2005 | Khouri et al. |
| 6,876,734 B1 | 4/2005 | Summers et al. |
| 6,879,586 B2 | 4/2005 | Turovsky et al. |
| 6,879,685 B1 | 4/2005 | Peterson et al. |
| 6,882,641 B1 | 4/2005 | Gallick et al. |
| 6,898,279 B1 | 5/2005 | Baker et al. |
| 6,905,414 B2 | 6/2005 | Danieli et al. |
| 6,907,123 B1 | 6/2005 | Schier |
| 6,912,275 B1 | 6/2005 | Kaplan |
| 6,917,672 B2 | 7/2005 | Brown et al. |
| 6,918,034 B1 | 7/2005 | Sengodan et al. |
| 6,928,558 B1 | 8/2005 | Allahwerdi et al. |
| 6,931,001 B2 | 8/2005 | Deng |
| 6,934,858 B2 | 8/2005 | Woodhill |
| 6,940,963 B2 | 9/2005 | Stumer et al. |
| 6,947,417 B2 | 9/2005 | Laursen et al. |
| 6,959,184 B1 | 10/2005 | Byers et al. |
| 6,977,993 B2 | 12/2005 | Starbuck et al. |
| 6,985,745 B2 | 1/2006 | Quaid |
| 6,987,744 B2 | 1/2006 | Harrington et al. |
| 7,031,449 B1 | 4/2006 | Lundy et al. |
| 7,042,989 B2 | 5/2006 | Lawson |
| 7,076,041 B2 * | 7/2006 | Brown et al. ............ 379/142.05 |
| 7,085,244 B2 | 8/2006 | Koskelainen et al. |
| 7,120,135 B2 | 10/2006 | Kim |
| 7,139,370 B1 | 11/2006 | Tse |
| 7,162,020 B1 | 1/2007 | Forte |
| 7,189,132 B2 | 3/2007 | Nacik et al. |
| 7,213,073 B1 * | 5/2007 | Slavin ........................ 709/230 |
| 7,275,109 B1 | 9/2007 | Lee |
| 7,333,614 B2 | 2/2008 | Jarosinski et al. |
| 7,379,471 B2 | 5/2008 | Mitsumori et al. |
| 7,389,351 B2 * | 6/2008 | Horvitz ........................ 709/227 |
| 7,463,730 B2 | 12/2008 | Katkam et al. |
| 7,466,801 B2 | 12/2008 | Miller et al. |
| 7,529,552 B2 | 5/2009 | Cighir et al. |
| 7,561,892 B2 | 7/2009 | Huh et al. |
| 7,694,138 B2 | 4/2010 | O'Gorman et al. |
| 2001/0038624 A1 * | 11/2001 | Greenberg et al. ............ 370/352 |
| 2002/0010008 A1 | 1/2002 | Bork et al. |
| 2002/0040936 A1 | 4/2002 | Wentker et al. |
| 2002/0068537 A1 | 6/2002 | Shim et al. |
| 2002/0077102 A1 | 6/2002 | Achuthan et al. |
| 2002/0086680 A1 | 7/2002 | Hunsinger |
| 2002/0090076 A1 | 7/2002 | Uppaluru et al. |
| 2002/0098831 A1 | 7/2002 | Castell et al. |
| 2002/0132638 A1 | 9/2002 | Plahte et al. |
| 2002/0140745 A1 | 10/2002 | Allenby et al. |
| 2002/0167937 A1 | 11/2002 | Goodman |
| 2002/0178228 A1 | 11/2002 | Goldberg |
| 2002/0181691 A1 | 12/2002 | Miller et al. |
| 2002/0188755 A1 | 12/2002 | Yeom |
| 2002/0196928 A1 | 12/2002 | Johnson et al. |
| 2002/0198004 A1 | 12/2002 | Heie et al. |
| 2003/0043992 A1 | 3/2003 | Wengrovitz |
| 2003/0061496 A1 | 3/2003 | Ananda |
| 2003/0172185 A1 * | 9/2003 | Dezonno ........................ 709/246 |
| 2004/0003070 A1 | 1/2004 | Fernald et al. |
| 2004/0024640 A1 | 2/2004 | Engle et al. |
| 2004/0066932 A1 | 4/2004 | Seligmann |
| 2004/0078334 A1 | 4/2004 | Malcolm et al. |
| 2004/0078349 A1 | 4/2004 | Syrjala et al. |
| 2004/0109555 A1 | 6/2004 | Williams |
| 2004/0121774 A1 | 6/2004 | Rajkotia et al. |
| 2004/0128350 A1 | 7/2004 | Topfl et al. |
| 2004/0131206 A1 | 7/2004 | Cao et al. |
| 2004/0198454 A1 * | 10/2004 | Chavez et al. ................. 455/565 |
| 2004/0205330 A1 | 10/2004 | Godfrey et al. |
| 2004/0248586 A1 | 12/2004 | Patel et al. |
| 2005/0022020 A1 | 1/2005 | Fremberg |
| 2005/0031110 A1 | 2/2005 | Haimovich et al. |
| 2005/0053219 A1 | 3/2005 | Pearson |
| 2005/0059463 A1 | 3/2005 | Gilmore et al. |
| 2005/0069102 A1 | 3/2005 | Chang |
| 2005/0069113 A1 | 3/2005 | Suh |
| 2005/0089053 A1 | 4/2005 | Zhu |
| 2005/0157708 A1 | 7/2005 | Chun |
| 2005/0177622 A1 | 8/2005 | Spielman et al. |
| 2005/0197110 A1 | 9/2005 | Hasan et al. |
| 2005/0212749 A1 | 9/2005 | Marvit |
| 2005/0226403 A1 * | 10/2005 | Lenard ...................... 379/266.07 |
| 2005/0239486 A1 | 10/2005 | D'Avello |
| 2005/0272413 A1 | 12/2005 | Bourne |
| 2005/0273333 A1 | 12/2005 | Morin et al. |
| 2005/0286705 A1 | 12/2005 | Contolini et al. |

(56) References Cited

U.S. PATENT DOCUMENTS

| | | |
|---|---|---|
| 2006/0009238 A1 | 1/2006 | Stanco |
| 2006/0034336 A1 | 2/2006 | Huh et al. |
| 2006/0035657 A1 | 2/2006 | Lim |
| 2006/0036857 A1 | 2/2006 | Hwang |
| 2006/0045252 A1 | 3/2006 | Gorti |
| 2006/0068731 A1 | 3/2006 | Seier |
| 2006/0079280 A1 | 4/2006 | LaPerch |
| 2006/0084414 A1 | 4/2006 | Alberth |
| 2006/0104218 A1 | 5/2006 | Kako |
| 2006/0105790 A1 | 5/2006 | Jin et al. |
| 2006/0116175 A1 | 6/2006 | Chu |
| 2006/0126529 A1 | 6/2006 | Hardy |
| 2006/0147002 A1 | 7/2006 | Desai et al. |
| 2006/0206454 A1 | 9/2006 | Forstall et al. |
| 2006/0221942 A1 | 10/2006 | Fruth et al. |
| 2006/0239277 A1 | 10/2006 | Gallagher |
| 2007/0005963 A1 | 1/2007 | Eldar et al. |
| 2007/0036322 A1 | 2/2007 | Goldman et al. |
| 2007/0037610 A1 | 2/2007 | Logan |
| 2007/0064908 A1 | 3/2007 | Levy et al. |
| 2007/0112571 A1 | 5/2007 | Thirugnana |
| 2008/0123829 A1 | 5/2008 | Smith et al. |
| 2008/0146216 A1 | 6/2008 | Newman et al. |
| 2008/0233924 A1 | 9/2008 | Baird et al. |

FOREIGN PATENT DOCUMENTS

| | | |
|---|---|---|
| EP | 1560140 | 8/2005 |
| EP | 1731995 | 12/2006 |
| GB | 2347593 | 9/2000 |
| GB | 2 406 464 | 3/2005 |
| WO | PTC/AU99/00247 | 4/1999 |
| WO | WO 2006/057770 | 10/2005 |
| WO | WO 2005/104520 | 11/2005 |
| WO | WO 2006/028514 | 3/2006 |
| WO | WO 2006/071420 | 7/2006 |

OTHER PUBLICATIONS

Jing Zheng, Horacio Franco, and Andreas Stolcke, "Rate of Speech Modeling for Large Vocabulary Conversation Speech Recognition", May 18, 2001, (5 pages) Speech Technology and Research Laboratory SRI International, http://www.speech.sri.com.

L.Melscoet, "Alcatel CCweb: Marriage of The Internet With The Call Center The Alcatel Ccweb Enables a Company to Combine Its Web Site and Call Center Into a Powerful Contact Center", Electrical communication, Alcatel, Brussels, BE, No. 1, 2000, (pp. 43-47).

D.Steul, "Redefining The Call Center: Customer Service on The Internet", Alcatel telecommunications Review, Alcatel, Paris Cedex, FR, Mar. 2000, (6 pages).

How to Build Smart Appliances, Albercht Schmidt, Kristof Van Laerhoven, IEEE Personal Communications, Aug. 2001, pp. 66-71.

Schulzrinne H et al: "Signaling for Internet telephony" Network Protocols, 1998. Proceedings. Sixth International Conference O N Austin, TX, USA Oct. 13-16, 1998, Los Alamitos, CA, USA, IEEE, Comput. Soc, US LNKD-D0I:10.1109/ICNP.1998.723751, Oct. 13, 1998, pp. 298-307, XP010309377 ISBN: 978-0-8186-8988-8 *p. 303, right-hand colu.

* cited by examiner

AUTHORIZATION TO PLACE CALLS BY REMOTE USERS

TECHNICAL FIELD

The present disclosure relates generally to the fields of telephony and communication systems.

BACKGROUND

To save money, many business enterprises implement some sort of authorization system to control and/or restrict the placement of telephone calls by their employees. For example, forced authorization codes (FACs), which require a caller to enter a valid authorization code prior to extending calls to classes of dialed number, are commonly used in private branch exchange (PBX) systems to regulate the types of calls that certain users can place (e.g., international calls and external toll calls). In such a system, a user placing a call needs to enter a valid FAC code in order for the call to be extended beyond the PBX. Modern PBX systems typically implement this feature by having an administrator set the FAC codes in the system, and then distribute these codes to selected users that have a legitimate business need to place an international or toll call.

One problem with the FAC approach to regulating toll calls is that the authorization rights are statically assigned to users, which, often times, is counter productive. For example, in a large organization or enterprise a number of employees normally have no need to place long distance or international calls as part of their normal work. The system administrator may therefore block or restrict their ability to place these types of calls. Occasionally, however, a blocked employee may need to place such a call in the course of performing their work duties. In such cases, the use of statically assigned FACs does not work very well. That is, the FAC feature in existing PBX systems lacks the flexibility to allow a normally restricted employee (one without access to a valid FAC) to place certain international or toll calls in special situations.

BRIEF DESCRIPTION OF THE DRAWINGS

The present disclosure will be understood more fully from the detailed description that follows and from the accompanying drawings, which however, should not be taken to limit the invention to the specific embodiments shown, but are for explanation and understanding only.

DETAILED DESCRIPTION

In the following description specific details are set forth, such as device types, system configurations, communication methods, etc., in order to provide a thorough understanding of the present invention. However, persons having ordinary skill in the relevant arts will appreciate that these specific details may not be needed to practice the present invention.

According to one embodiment, a mechanism is provided for a PBX system that allows persons without access to a valid FAC to dynamically seek the permission from a set of pre-designated supervisors/managers who can authorize (or deny) the call based on information provided regarding the purpose of the call. In other embodiments, the PBX system may generally comprise any communications node capable of the implementing the functions described herein.

Figure 1:
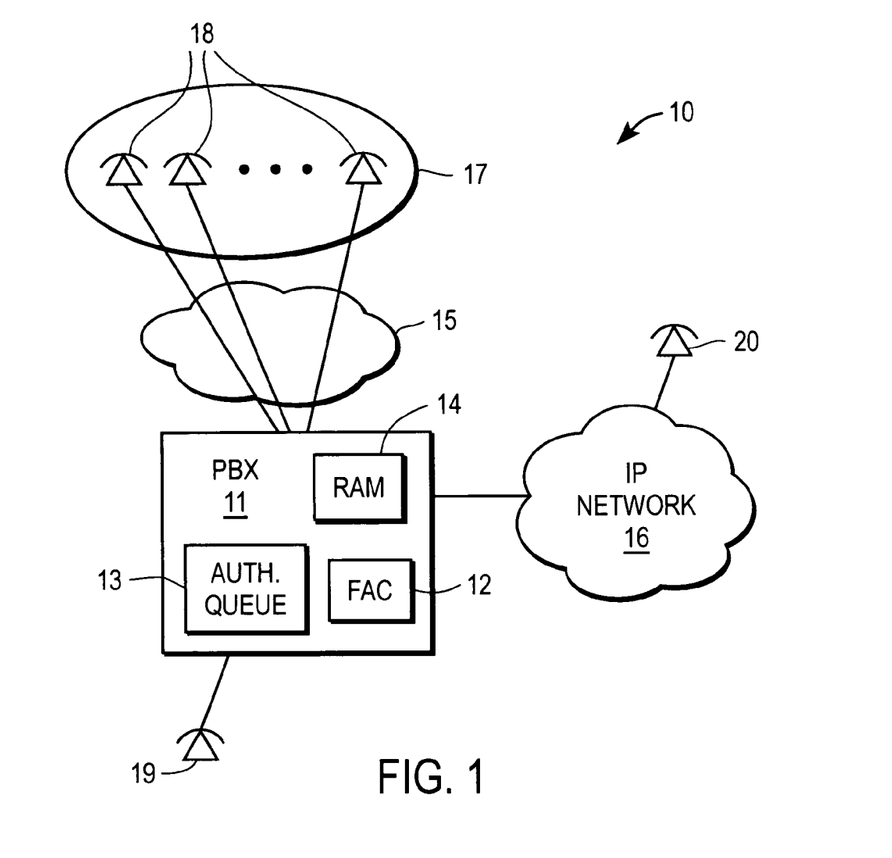
FIG. 1 illustrates an example telephony/communication system.

FIG. 1 illustrates an example telephony/communication system 10 that includes a PBX system 11 that runs a call management software (or firmware) program for implementing call routing, processing and telephony functions. In the embodiment shown, PBX 11 is capable of communicating with other devices over an Internet protocol (IP) network. In other embodiments, PBX 11 comprises a more conventional PBX system that handles calls sent over a conventional public switched telephone network (PSTN). PBX 11 is shown including an authorization queue 13, a FAC module 12, and a configurable Remote Authorization Mode (RAM) module 14. Authorization queue 13 is used to hold or collect calls waiting for authorization by an appropriate supervisor. During the time that the outbound call is in queue 13 or while being reviewed by a supervisor, the call is essentially paused, with no connection being yet made to the destination telephone device addressed by the dialed number.

FAC module 12 stores the FACs and associated call route patterns. RAM module 14 associates certain route patterns with particular remote users/supervisors or sets of supervisors that may be contacted to authorize or deny a toll call placed by a person or user from a telephone device 19 within the organization. By way of example, FIG. 1 shows a set 17 of supervisors 18 that may be contacted by PBX 11 via network 15 for the purpose of authorizing a call for persons who do not have a FAC. Network 15 may comprise an IP network, intranet, PSTN, ISDN, or any other voice/data network capable of communications with PBX 11. In this example, PBX 11 is also shown connected with an IP network 16, which may be utilized for communications with a remote user (callee) of telephone device 20. It is appreciated that other types of networks, such as a PSTN or a cellular wireless network may also be connected with PBX 11.

Figure 6:
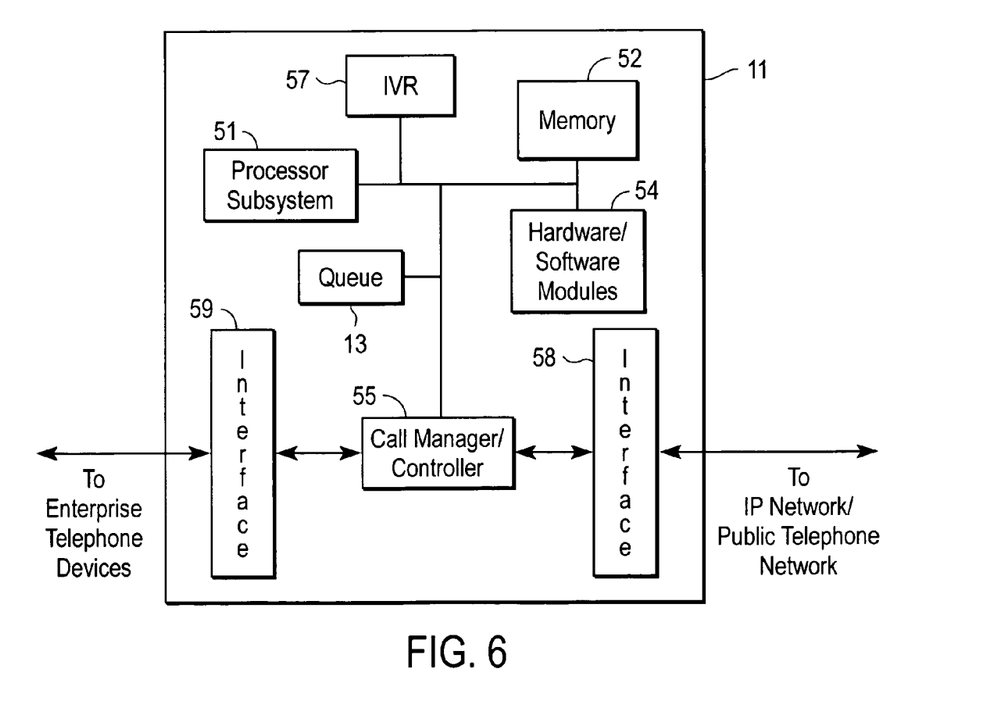
FIG. 6 is an example detailed block diagram of a PBX system.

FIG. 6 is an example detailed block diagram of a PBX system 11 that includes a processor subsystem 51 having one or more processors coupled to a memory 52 (e.g., random-access memory) that may comprise a database containing existing user preferences and/or configuration settings. PBX 11 also includes an IVR unit 57, hardware/software modules 54, which may include FAC module 12 and RAM module 14 (see FIG. 1), and a call manager/controller unit 55 that functions to route calls between interfaces 58 & 59 having lines connected to network 15, IP network 16, a PSTN, etc., as well as telephone devices of the enterprise (e.g., device 19, as shown in FIG. 1). Call router/controller unit 55 may also be utilized for communications with callers and the users of the enterprise telephone devices. An example of such communications is the play-out of IVR scripts to a caller during the process of authorizing a remote (e.g., international or toll) call, as described in more detail below.

Practitioners in the art will appreciate that modules 54 may be implemented in software, hardware, or firmware components, and, in certain embodiments, may be connected to PBX 11 as separate components, rather than being incorporated within system 11.

In one implementation, IVR unit 57 may comprise a telephony script or a navigation menu module that may prompt a caller to state his identity, client matter number, the purpose or reason for his call, etc., and also to notify a third party supervisor that an outgoing call requires authorization. IVR unit 57 is typically embodied in one or more software or firmware modules with code that executes on one or more processors of subsystem 51. In other embodiments, IVR unit 57 may include dedicated processors that perform various tasks, such as speech processing, verification, and recognition. It is appreciated that PBX system 11 may also include a variety of other devices (e.g., controllers, EEPROMs, specialized processors, etc.) not shown in FIG. 6.

Referring again to FIG. 1, RAM 14 may be configured for various different communications modes, such as Instant Messaging (IM) or standard phone numbers. For each of these modes, there is a remote, supervisory party configuration which may comprise an Instant Message ID or a phone number. For each communications mode configuration, there is an associated number configuration (NC), which contains lists of phone numbers of users. By way of example, when a user of telephone device 19 calls a number that requires a FAC (e.g., a call to phone 20), PBX 11 first determines whether telephone device 19 has a number listed in its NC lists; if so, the system retrieves the associated remote, supervisory party information. PBX 11 then establishes communication with the remote, supervisory party (e.g., a supervisor 18) using the configured communications mode (e.g., IM or phone). The supervisor may either extend (i.e., authorize) or reject the call based on information provided about the nature or reason for the call.

When a person in the organization who does not have a FAC places a toll call, the route pattern of that call is associated with a particular supervisor or set of supervisors, each of which may have a preferred mode of communications. For instance, RAM 14 may identify that the appropriate communications mode for a particular supervisor is IM. Thus, when the system refers the call to that supervisor for authorization, an IM message may pop up on the display screen of the supervisor's PC with a message such as "X is trying to reach Y. Please press the 'Authorize' button on the screen if call needs to be extended or press the 'Deny'" button if call is to be dropped". In such an embodiment, the IM client may automatically generate and display the "Authorize" and "Deny" buttons. Alternatively, the supervisor may type the word "authorize" followed by an authorization code, etc., or "reject". In one embodiment, if the supervisor denies the call then he may also type in a reason for denying the call. This reason may then be played back to the user (caller). If the particular supervisor is not logged in, or does not respond to the IM message within pre-specified timer, then system may take a default action, e.g., deny the call, or attempt to contact another supervisor in the set.

Alternatively, PBX 11 may identify that the appropriate communications mode for a particular supervisor is via a telephone number. In this case, system 11 may place a telephone call to the remote supervisor and play an IVR message that asks the supervisor to either authorize or reject the call. Remote party can then authorize or reject using DTMF digits (such as #11 to authorize and #12 to reject) or using recognizable speech responses, e.g., by saying "authorize" or "reject". In one embodiment, the supervisor may state the reason for denying the call, which reason is then played back to the user (caller). Again, if the supervisor does not answer the call, then system may take a default action or attempt to contact another supervisor in the set.

In one embodiment, when a call is referred to a particular supervisor for authorization review, he may explicitly forward the decision-making authority over that call to another supervisor. The new supervisor receiving the forwarded call may or may not be included RAM 14. Basically, the supervisor is transferring his authority to someone else for just that one call or instance. For example, in the case where a software engineer is making a call to a customer, his manager (who has been configured as the supervisor) may transfer the authority to allow or reject that call to his technical leader who is dealing with that customer's cases. If the new supervisor (e.g., the technical leader) is not in the RAM, then the system may try various communication modalities or use a presence server to contact the new supervisor. In another embodiment, the supervisor may set up a preference in the PBX system such that all authorization requests related to customer ABC or case number XYZ be forwarded to his technical lead for authorization.

Figure 3:
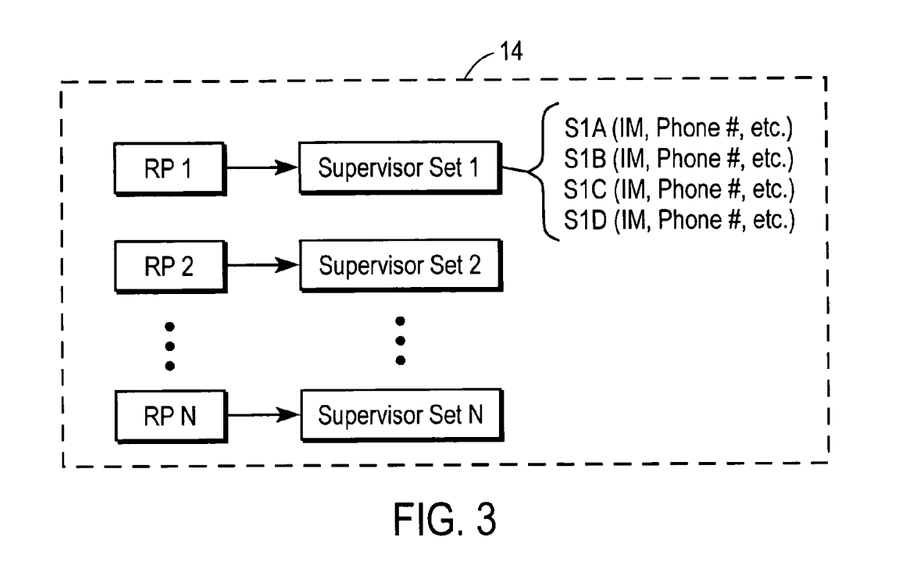
FIG. 3 illustrates an example Remote Authorization Mode module shown in FIG. 1.

FIG. 3 illustrates an example Remote Authorization Mode module 14 shown in FIG. 1. As can be seen, module 14 contains a set of route patterns (RP1, RP2 . . . RPN), each of which is associated with a set of supervisors to be contacted when a particular user in the organization attempts to place a call to a number that requires authorization. For instance, Supervisor Set 1 is shown having four supervisors (S1A-S1D), each having associated communication or contact information (e.g., IM, phone number, etc.). In this example, each supervisor has a preferred communication mode (e.g., IM) for purposes of authorizing calls. In certain implementations, a presence server may be utilized by system 11 to determine whether a particular supervisor is currently logged onto his PC, e.g., for purposes of receiving an IM communication. If not, the system may attempt to contact that supervisor via an alternative form of communication (e.g., phone, pager, email, etc.).

Figure 7:
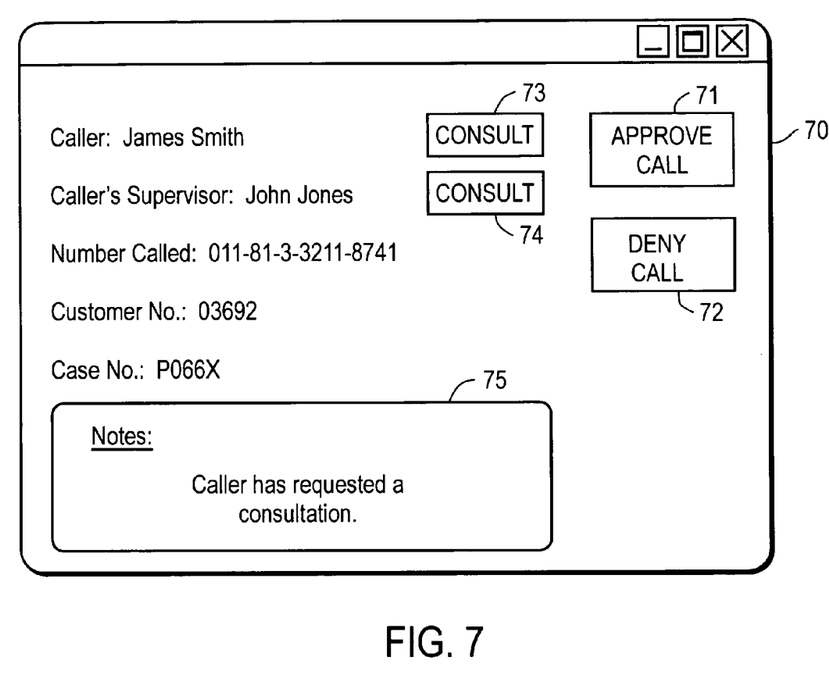
FIG. 7 illustrates an example graphical user interface (GUI) window for use in authorizing a remote call.

In the case a supervisor who is contacted to authorize a particular call, and who is logged onto a PC that is running an IM client or tool, PBX system 11 may dynamically seek out the supervisor and contact him via an IM message that pops up in a window on the screen of his PC. By way of example, FIG. 7 illustrates an example graphical user interface (GUI) window 70 for use in authorizing a remote call. Window 70 is displayed on the screen of the supervisor's PC with various call context information, such as the name of the caller, the caller's direct supervisor (who may be different than the supervisor designated for review/authorization of international and toll calls), the number called, the customer number associated with the call, a work-related case number, and a text note field 75. The context information shown in FIG. 7 may be provided by the caller via a series of IVR menu prompts, or automatically by the system. For example, PBX system 11 may automatically recognize or associate the dialed phone number with a particular customer number and/or case number.

Note field 75 may be utilized by the caller/user to communicate special information related to the call, or to present a specific request to the reviewing supervisor. In this example, note field 75 includes a user request for a consultation in order to explain the specific purpose or reason for the call. The supervisor may accept the request for a consultation with the caller, James Smith, by pressing or selecting (e.g., clicking) icon or button 73. Alternatively, the supervisor can consult with the caller's direct supervisor, John Jones, by clicking on button 74 in order to determine whether the call should be authorized. In different embodiments, consultations may be implemented in the GUI by another pop-up window that provides for IM communication, or, alternatively, by initiating a phone call form the supervisor to a phone number of the person with whom a consultation is desired.

In still other embodiments, note field 75 may be eliminated entirely, leaving the decision to consult with the caller (or his direct supervisor) solely in the hands of the supervisor via GUI window 70. For instance, the supervisor may click on button 73 to automatically establish a voice session with the caller (e.g., via either a standard call offer or a barge-in) in order to converse with the caller to determine the reason for the call.

Window 70 also includes buttons 71 & 72 for respectively approving or denying the call. In this example, buttons 71 & 72 may be clicked on or selected at any time by the supervisor. For instance, if the supervisor is convinced that the outbound call should be allowed, he may simply click on approval button 71. In one embodiment, clicking 72 may also bring up a dialog box or field to allow the supervisor to enter a reason for denial. In another embodiment, window 70 already has a dialog box to allow the supervisor to enter a reason for denying the call.

Figure 4:
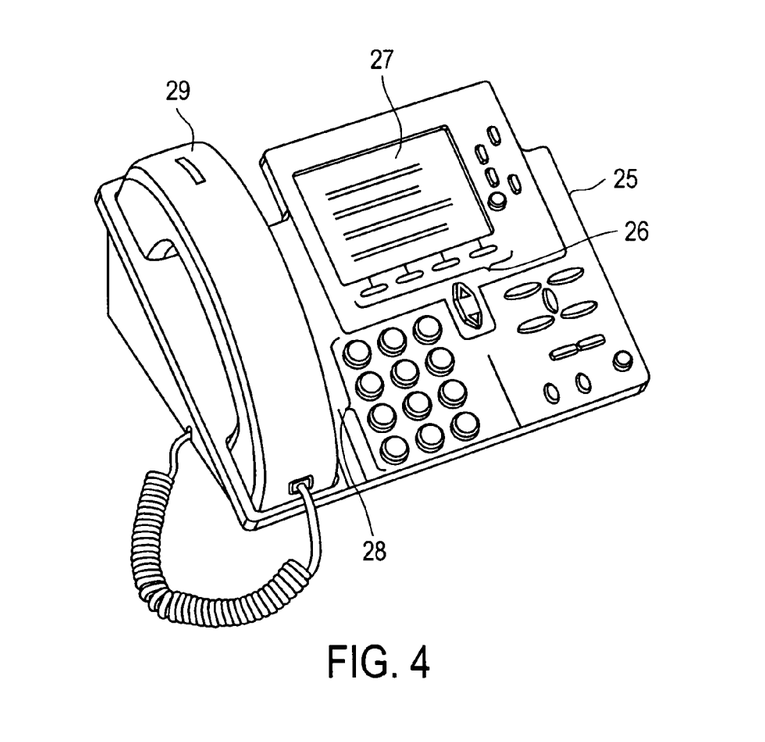
FIG. 4 illustrates an example IP telephone device with softkey functions.
Figure 5:
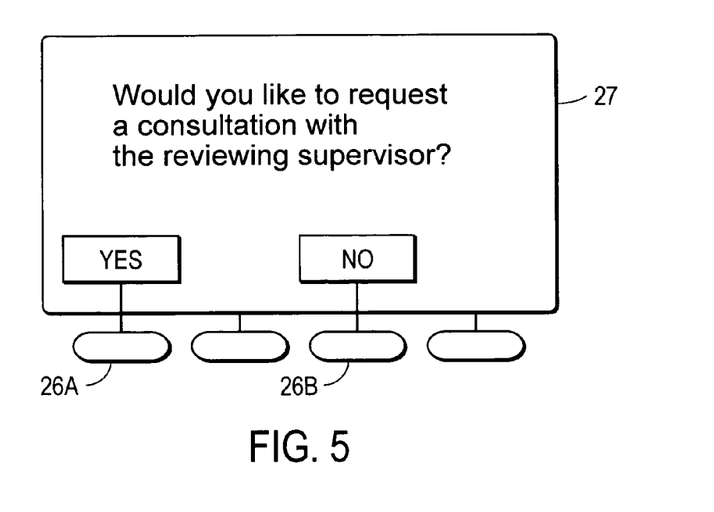
FIG. 5 illustrates an example display screen of the IP telephone device shown in FIG. 4.

FIG. 4 illustrates an example IP telephone device 25 with softkey functions that may be utilized by a caller/user who wishes to place a long-distance or toll call without a FAC. IP telephone 25 includes a liquid crystal display (LCD) screen 27, dynamic softkeys 26, a handset 29, and an alphanumerical keypad 28. In one embodiment, softkeys 26 may be used to automatically request a consultation with the reviewing supervisor. Such a consultation may be useful in relating the particular reason or business purpose of the call. For example, FIG. 5 illustrates screen 27 of IP telephone device 25 displaying a text message asking the caller whether they want to request a consultation with the reviewing supervisor. Softkeys 26A & 26B are automatically configured as single-button inputs to allow the user to either request ("Yes") or forego ("No") a consultation.

In yet embodiment, telephone device 25 may also be configured to have a text field where the user may enter his reason(s) for requesting approval (e.g., customer no., case no. etc.) using the alphanumeric key pad.

It is appreciated that different embodiments may execute different routines/approaches for establishing communications between the user and the selected meeting participant. For instance, in one embodiment, the softkeys of a user's telephone device might be automatically configured to provide the caller with the option of directing the call to a particular supervisor. In another embodiment, the caller is provided with the option (at the time of placing the call) of specifying the contact details (e.g., IM or phone number) of the supervisor who will decide whether to authorize that call. In another embodiment, rather than have the system automatically select an alternative supervisor from the set or pool of available supervisors in the event that the first or primary supervisor is unavailable, the system prompts the caller to enter the contact details of an alternate supervisor who can authorize placement of the call.

PBX system 11 may also be configured in a variety of ways to achieve different specific functions or implement certain features. In one embodiment, the system includes a mapping to a particular set of supervisors based on the time of day. For example, if someone is placing a call at 11 p.m. from a site in California, the system may automatically route the call to a set of supervisors located in another time zone, e.g., India, where supervisors are working normal business hours, and thus are available to authorize or deny the call. In other words, the system may implement various selection rules for routing calls to an appropriate pool of supervisors.

In another embodiment, the system provides a mechanism where a line owner of a telephone device can set a supervisory number (e.g., the owner's mobile phone) for outbound calls on the line. When activated, any call from the line automatically results in the system placing a call to line owner seeking permission or authorization for the call. Line owner then has the option to authorize or reject the call. This embodiment is useful in scenarios outside of a traditional business organization, such as where a father purchases a cell phone for his teenage daughter, but wants to control limit the number or type of calls she can place. Similarly, a store manager may want to restrict his employees from placing international or long distance calls, allowing such calls only after receiving a notification from the system asking for permission whenever an employee attempts to place an international or long distance call.

Figure 2:
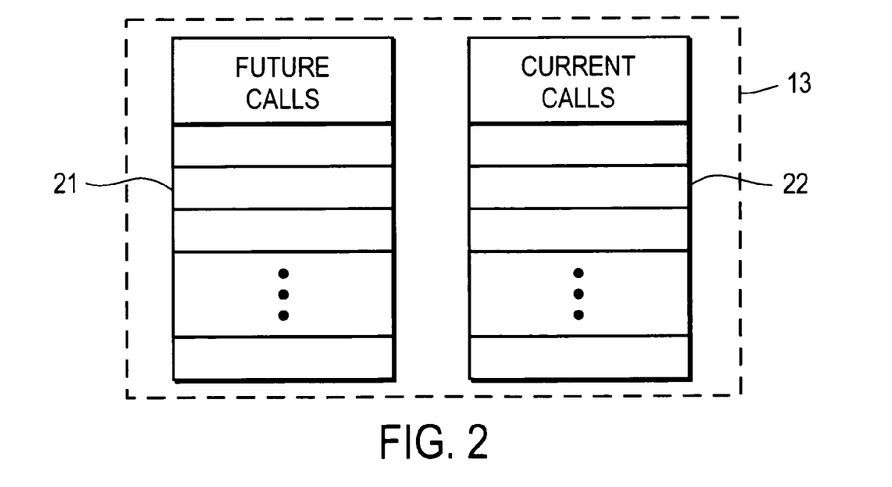
FIG. 2 illustrates an example authorization queue for use in the PBX system shown in FIG. 1.

FIG. 2 illustrates an example authorization queue for use in the PBX system shown in FIG. 1. In this example queue 13 comprises separate queues 21 and 22 for collecting/holding future and current calls, respectively, consistent with an embodiment that provides for pre-authorization of calls by supervisors. Such embodiment allows a caller to request pre-authorization of a particular call in advance of the actual call time.

Calls for which pre-authorization is requested are placed in queue 21, while current calls are placed in queue 22. One of the set of designated supervisors may authorize a call in queue 21 before the time the call is actually placed. The authorization is attached to the called number by the system along with the associated caller number and scheduled time of the call. For instance, an employee may request authorization for a call to a customer located in Japan with the call being scheduled next week at around 8 p.m. (e.g., +5 minutes) local time. An appropriate supervisor is then notified of the call by the system well in advance of the scheduled call time window. If the supervisor approves the call, the employee can call the customer at the scheduled time.

Figure 8:
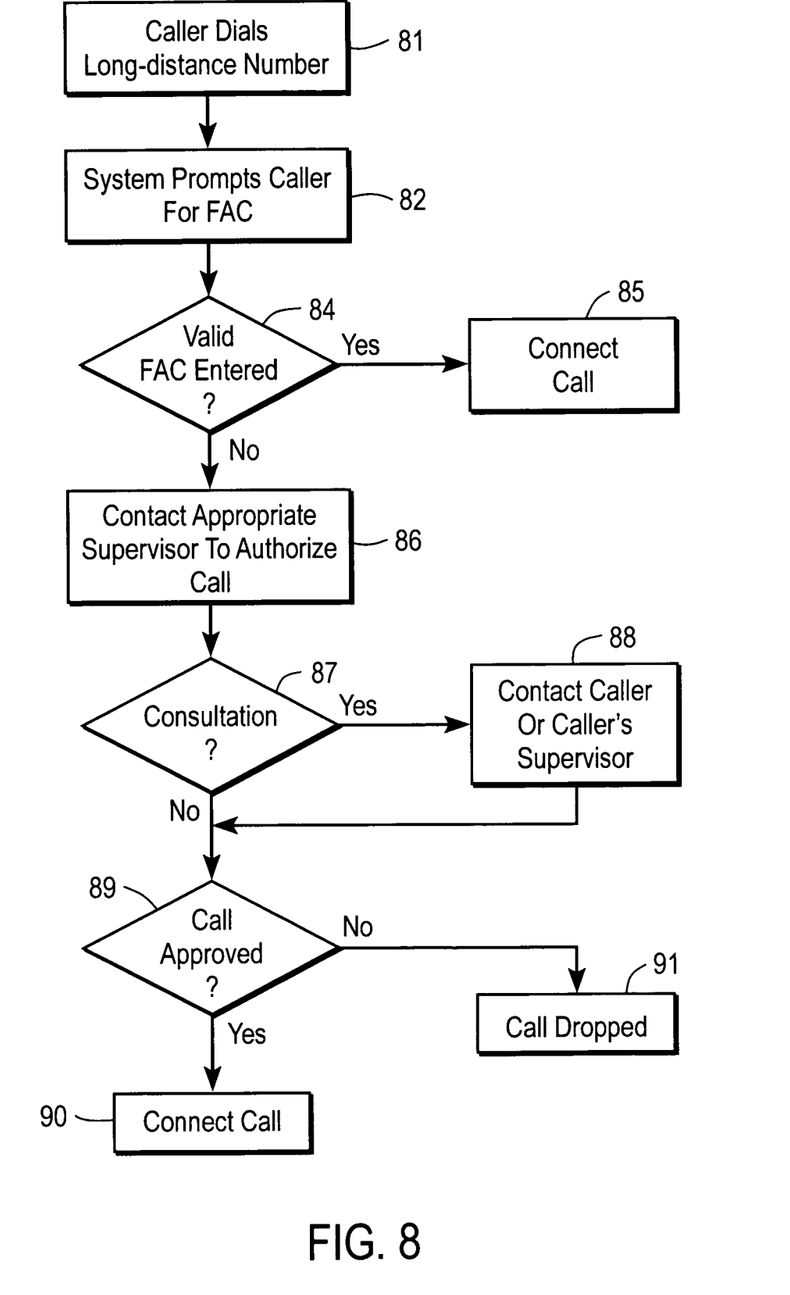
FIG. 8 illustrates an example method for third party authorization of a call prior to connecting the call.

FIG. 8 illustrates an example method for third party authorization of a call prior to actually establishing a call connection between the caller and callee. The example of FIG. 8 begins with the caller dialing a long-distance number from within an organization (block 81). Upon receiving the call and in response to the route pattern indicated by the number, the organization's PBX system prompts the caller/user to enter a FAC to connect the call. The prompt may be made via an IVR system, or, alternatively via IM if the user is logged onto or is placing the call from his PC. If the user is able to enter a valid FAC (block 84), then the PBX simply connects the call to the telephone number dialed (block 85). If, on the other hand, the user does not have a valid FAC, then the PBX system operates to contact an appropriate remote supervisor that has the authority to allow or deny the call (block 86). As previously discussed, a variety of different techniques, communications modes, and mechanisms may be used contact a particular supervisor.

Once the supervisor has been contacted and the call information is before the supervisor (e.g., via a GUI window or IVR playout), the supervisor is presented with the option of consulting with the caller or caller's direct supervisor (block 87). Because in most cases the decision to allow or deny a call is primarily based on the purpose or reason for the call, the supervisor may opt of a consultation to allow either the caller or the caller's supervisor to elaborate on the business purpose for making the call (block 88). In some cases consultation is unnecessary, as the purpose may be clearly evident from the information already provided to the supervisor. In other cases, the supervisor may summarily deny the call without consultation due to a change in business priorities, cost-cutting concerns, new business plans, changing customer relations protocols, etc. In still other instances, the supervisor may forward his decision-making authority to another person.

Whatever the case, at some point the supervisor makes a decision (block 89), and the call is either connected (block 90) or dropped (block 91). In certain embodiments, the supervisor may ignore the call such that after a predetermined time period where no decision has been made, the system automatically makes a default decision, i.e., either approve or deny depending on the default setting. In some embodiments the supervisor may also provide a reason for declining the call.

It should be further understood that elements of the present invention may also be provided as a computer program product which may include a machine-readable medium having stored thereon instructions which may be used to program a computer (e.g., a processor or other electronic device) to perform a sequence of operations. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards, or other type of machine-readable medium suitable for storing electronic instructions.

Additionally, although the present invention has been described in conjunction with specific embodiments, numerous modifications and alterations are well within the scope of the present invention. Accordingly, the specification and drawings are to be regarded in an illustrative rather than a restrictive sense.

We claim:

1. A private branch exchange (PBX) system comprising:
a first interface to connect with a network;
a second interface to connect with a telephone device of a caller; and
a unit operable to control a connection between the first and second interfaces for an outbound call from the telephone device of the caller to a remote telephone device of a callee connected to the network, the outbound call requiring a valid authorization code; and
a processor subsystem coupled with the unit and operable to:
receive the outbound call dialed by the caller to a number of the callee, the outbound call requiring the valid authorization code which the caller lacks;
hold the outbound call in a queue;
initiate communications with a telecommunications device associated with a first supervisor;
present, through a graphical user interface (GUI) window displayed on a screen of the telecommunications device associated with the first supervisor, information about the outbound call and a selectable option to allow or deny the outbound call, the information comprising a name of the caller and a reason for the outbound call, the supervisor having authority to allow or deny the outgoing call; and
provide, on a GUI window of the telecommunication device, a selectable option to consult with the caller, a selectable option to communicate with a telecommunications device of a second supervisor, and a selectable option to forward the outbound call to the telecommunications device of the second supervisor, prior to allowing or denying the outbound call;

wherein the unit is further operable to:
make the connection for the outbound call to the remote telephone device associated with the number of the callee in response to the first supervisor selecting the selectable option received from the telecommunications device of the first supervisor that indicates the first supervisor is allowing the outbound call; and
drop the outbound call in response to the first supervisor selecting the selectable option received from the telecommunications device of the first supervisor that indicates the first supervisor is denying the outbound call and provide the first supervisor with a dialog box for communication with the caller allowing the first supervisor to enter a reason for dropping the outbound call.

2. The PBX system of claim 1 wherein the processor subsystem is further operable to determine a preferred communications mode for communicating with the first supervisor.

3. The PBX system of claim 1 further comprising a module coupled with the processor subsystem, the module containing a listing of call route patterns, each call route pattern being mapped to a set of supervisors, the processor subsystem being operable to access the listing in the module in response to the outbound call, and to select one of the supervisors in the set as the first supervisor.

4. The PBX system of claim 3 wherein the module further includes the preferred communications mode of the first supervisor.

5. The PBX system of claim 1 further comprising a queue that holds the outbound call until the first supervisor has been contacted.

6. The PBX system of claim 1, wherein the information about the outbound call and an option to allow or deny the outbound call is presented to the first supervisor via instant messaging (IM).

7. The PBX system of claim 1, wherein the information about the outbound call and an option to allow or deny the outbound call is presented to the first supervisor via an interactive voice response (IVR) script.

8. The PBX system of claim 1 wherein the processor subsystem is further operable to
present the reason from the first supervisor for denying the outbound call to the caller.

9. A computer-implemented method for regulating the placement of outbound telephone calls of an enterprise comprising:
receiving, at a communications node, an outbound call dialed by a caller to a number of a callee, the outbound call requiring a valid authorization code which the caller lacks, wherein the communications node comprises a private branch exchange (PBX);
holding, by the communications node, the outbound call in a queue;
notifying, by the communications node, a first supervisor of the outbound call through a graphical user interface (GUI) window displayed on a screen of a telecommunications device associated with the first supervisor;
providing, on the GUI window of the telecommunications device, information about the outbound call and a selectable option to allow or deny the outbound call, the information comprising a name of the caller and a reason for the outbound call;
providing, on the GUI window of the telecommunication device, a selectable option to consult with the caller, a selectable option to communicate with a telecommunications device of a second supervisor, and a selectable option to forward the outbound call to the telecommunications device of the second supervisor, prior to allowing or denying the outbound call; and connecting, by the communications node, the outbound call to a device associated with the number of the callee in response to the first supervisor selecting the selectable option that indicates the first supervisor is allowing the outbound call, the selectable option indicating the first supervisor is allowing the outbound call received from the telecommunications device associated with the first supervisor; and dropping, by the communications node, the outbound call in response to the first supervisor selecting the selectable option that indicates the first supervisor is denying the outbound call and providing the first supervisor with a dialog box for communication with the caller allowing the first supervisor to enter a reason for dropping the outbound call.

10. The computer-implemented method of claim 9 wherein the information further includes a customer number and/or a case number, and the number of the callee.

11. The computer-implemented method of claim 9 further comprising determining a mode of communication with the supervisor using a presence server.

12. A non-transitory computer-readable storage medium encoded with a computer program, which, when executed, is operable to:

receive, at a private branch exchange (PBX), an outbound call dialed by a caller to a number of a callee, the outbound call requiring a valid authorization code which the caller lacks;

hold, by the PBX, the outbound call in a queue;

notify, by the PBX, a first supervisor of the outbound call through a graphical user interface (GUI) window displayed on a screen of a telecommunications device associated with the first supervisor;

provide, on the GUI window of the telecommunication device, information about the outbound call and a selectable option to allow or deny the outbound call, the information comprising a name of the caller and a reason for the outbound call;

provide, on the GUI window of the telecommunication device, a selectable option to consult with the caller, a selectable option to communicate with a telecommunications device of a second supervisor, and a selectable option to forward the outbound call to the telecommunications device of the second supervisor, prior to allowing or denying the outbound call;

connect, by the PBX, the outbound call to a device associated with the number of the callee in response to the first supervisor selecting the selectable option that indicates the first supervisor is allowing the outbound call, the selectable option indicating the first supervisor is allowing the outbound call received from the telecommunications device associated with the first supervisor; and drop, by the PBX, the outbound call in response to the first supervisor selecting the selectable option that indicates the first supervisor is denying the outbound call and providing the first supervisor with a dialog box for communication with the caller allowing the first supervisor to enter a reason for dropping the outbound call.

13. The non-transitory computer-readable storage medium of claim 12 wherein the computer program, when executed, is further operable to:

locate the first supervisor; and identify a communications mode to be used to notify the first supervisor of the outbound call.

* * * * *